(12) United States Patent  
Shin et al.

(10) Patent No.: US 12,461,139 B2
(45) Date of Patent: Nov. 4, 2025

(54) TEST DEVICE AND TEST SYSTEM FOR SEMICONDUCTOR DEVICES

(71) Applicant: SAMSUNG ELECTRONICS CO., LTD., Suwon-si (KR)

(72) Inventors: Seong Seob Shin, Suwon-si (KR); Soon Il Kwon, Suwon-si (KR); Soo Yong Park, Suwon-si (KR); Tae-Hwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 18/384,910

(22) Filed: Oct. 30, 2023

(65) Prior Publication Data

US 2024/0175912 A1 May 30, 2024

(30) Foreign Application Priority Data

Nov. 24, 2022 (KR) .................. 10-2022-0158948

(51) Int. Cl.
*G01R 31/28* (2006.01)
(52) U.S. Cl.
CPC ............................. *G01R 31/2806* (2013.01)
(58) Field of Classification Search
CPC ............ G01R 31/2806; G01R 31/2889; G01R 31/3195; G01R 31/31924; G01R 31/3191; G01R 31/31905; G01R 31/31932
See application file for complete search history.

(56) References Cited

U.S. PATENT DOCUMENTS

| 5,086,271 | A | | 2/1992 | Haill et al. |
| 5,321,277 | A | * | 6/1994 | Sparks .............. G01R 31/3163 365/201 |
| 5,471,481 | A | * | 11/1995 | Okumoto ....... G01R 31/318555 714/724 |
| 7,688,099 | B2 | | 3/2010 | Kim et al. |
| 7,872,488 | B2 | | 1/2011 | Kang |
| 8,326,565 | B2 | | 12/2012 | Daub et al. |
| 8,373,432 | B2 | | 2/2013 | Johnson |
| 9,201,092 | B2 | | 12/2015 | Behrens et al. |
| 9,459,302 | B2 | | 10/2016 | Oh |

(Continued)

FOREIGN PATENT DOCUMENTS

| KR | 10-2011-0094747 | 8/2011 |
| KR | 10-1956080 | 3/2019 |
| KR | 102215319 | 2/2021 |

*Primary Examiner* — Thang X Le
(74) *Attorney, Agent, or Firm* — MORGAN, LEWIS & BOCKIUS LLP

(57) ABSTRACT

A test device includes a main board. First and second device under test (DUT) boards are disposed on the main board. First and second semiconductor devices are mounted on the first and second DUT boards, respectively. The first and second semiconductor devices are DUTs. First and second connectors are respectively disposed at a first end and a second end of the first DUT board. The first and second connectors are spaced apart from each other and respectively transmit first and second signals. The first signal forms a first electrical path along which the first signal is input to the first DUT board via the first connector. The second signal forms a second electrical path along which the second signal is output from the first DUT board and input to the second DUT board via the second connector.

17 Claims, 9 Drawing Sheets

(56) References Cited

U.S. PATENT DOCUMENTS

| | | | | |
|---|---|---|---|---|
| 2006/0270069 | A1* | 11/2006 | Yamasaki | G01R 31/30 438/10 |
| 2006/0273809 | A1* | 12/2006 | Miller | G01R 31/31926 324/750.05 |
| 2020/0379006 | A1* | 12/2020 | Turchin | G01R 1/0433 |
| 2020/0379035 | A1* | 12/2020 | Yun | G01R 31/2867 |

* cited by examiner

TEST DEVICE AND TEST SYSTEM FOR SEMICONDUCTOR DEVICES

This application claims priority under 35 U.S.C. § 119 to Korean Patent Application No. 10-2022-0158948, filed on Nov. 24, 2022 in the Korean Intellectual Property Office, the disclosure of which is incorporated by reference in its entirety herein.

1. Technical Field

The present disclosure relates to a test device and a test system for semiconductor devices, and more particularly, to a test device and a test system in which a plurality of semiconductor devices are mounted as devices under test (DUTs).

2. Discussion of Related Art

Electronic products have become increasingly miniaturized, multi-function and larger in capacity along with the rapid development of the electronic industry. Accordingly, tests on semiconductor devices included in the electronic products are becoming increasingly complicated.

For example, in a test environment, tens or hundreds of semiconductor devices may be simultaneously tested as devices under test (DUTs). Therefore, it is desired to have a test device and a test system that can satisfy various test environments.

SUMMARY

Aspects of the present disclosure provide a test device for semiconductor devices, the test device having increased signal characteristics.

Aspects of the present disclosure also provide a test system for semiconductor devices, the test system having increased signal characteristics.

However, aspects of the present disclosure are not restricted to the one set forth herein. The above and other aspects of the present disclosure will become more apparent to one of ordinary skill in the art to which the present disclosure pertains by referencing the detailed description of embodiments of the present disclosure given below.

According to an embodiment of the present disclosure, a test device includes a main board. First and second device under test (DUT) boards are disposed on the main board. First and second semiconductor devices are mounted on the first and second DUT boards, respectively. The first and second semiconductor devices are DUTs. First and second connectors are respectively disposed at a first end and a second end of the first DUT board. The first and second connectors are spaced apart from each other and respectively transmit first and second signals. The first signal forms a first electrical path along which the first signal is input to the first DUT board via the first connector. The second signal forms a second electrical path along which the second signal is output from the first DUT board and input to the second DUT board via the second connector.

According to an embodiment of the present disclosure, a test device includes a main board. First and second DUT boards are disposed on the main board. First and second semiconductor devices are mounted on the first and second DUT boards, respectively. The first and second semiconductor devices are DUTs. A first transmission line is connected to an input terminal of the first DUT board. A first signal input to the first DUT board is transmitted through the first transmission line. A second transmission line is connected to an output terminal of the first DUT board. A second signal output from the first DUT board and input to the second DUT board is transmitted through the second transmission line. The first and second transmission lines are independent electrical lines that are not shared with each other.

According to an embodiment of the present disclosure, a test system includes a test facility comprising a test chamber. A test board is disposed in the test chamber and receives power from the test facility. The test board comprises a main board. First and second DUT boards are disposed on the main board. First and second semiconductor devices are mounted on the first and second DUT boards, respectively. The first and second semiconductor devices are DUTs. A first transmission line is connected to an input terminal of the first DUT board. A first signal input to the first DUT board is transmitted through the first transmission line. A second transmission line is connected to an output terminal of the first DUT board. A second signal output from the first DUT board and input to the second DUT board is transmitted through the second transmission line. A transmission line is not formed between the input terminal and the output terminal in the main board.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION OF EMBODIMENTS

Figure 1:
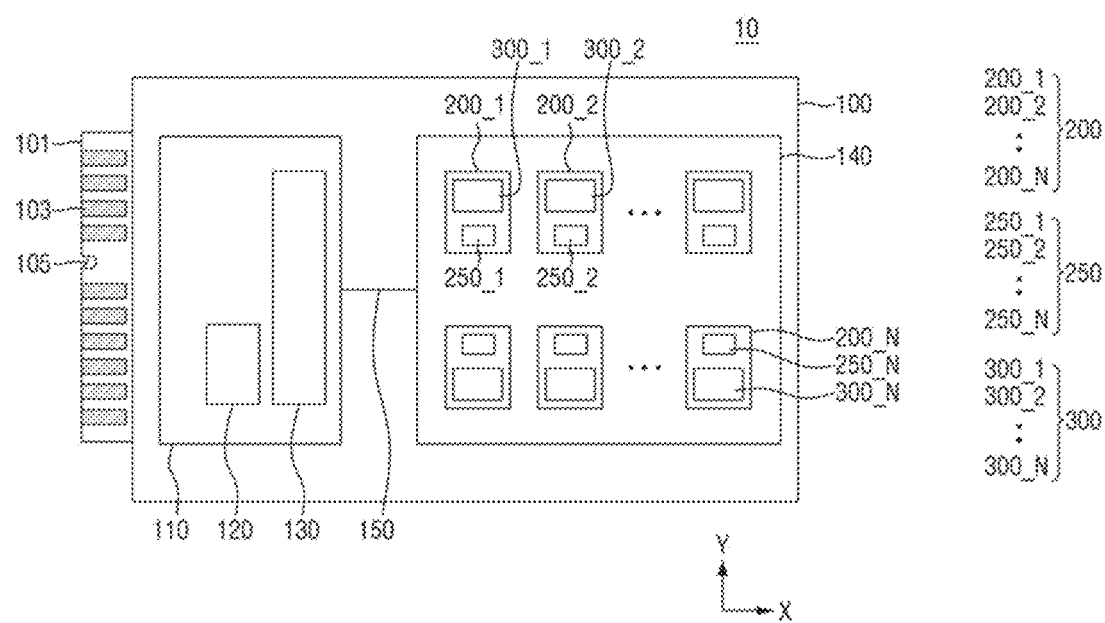
FIG. 1 illustrates a test device according to an embodiment of the present disclosure.

Hereinafter, embodiments of the present disclosure will be described in detail with reference to the accompanying drawings. Like reference numerals in the drawings denote like elements, and thus a repeated description may be omitted for economy of description.

FIG. 1 illustrates a test device 10 according to an embodiment of the present disclosure.

Referring to FIG. 1, the test device 10 may include a test host area 110 and a device under test (DUT) board mounting area 140. The test device 10 may include a main board 100, a connection unit 101 disposed on a side of the main board 100, a test memory 120 and a test controller 130 disposed on the main board 100, DUT boards 200 connected to the main board 100 and on which semiconductor devices 300 are mounted as DUTs, and connectors 250 connected to the DUT boards 200.

Figure 6:
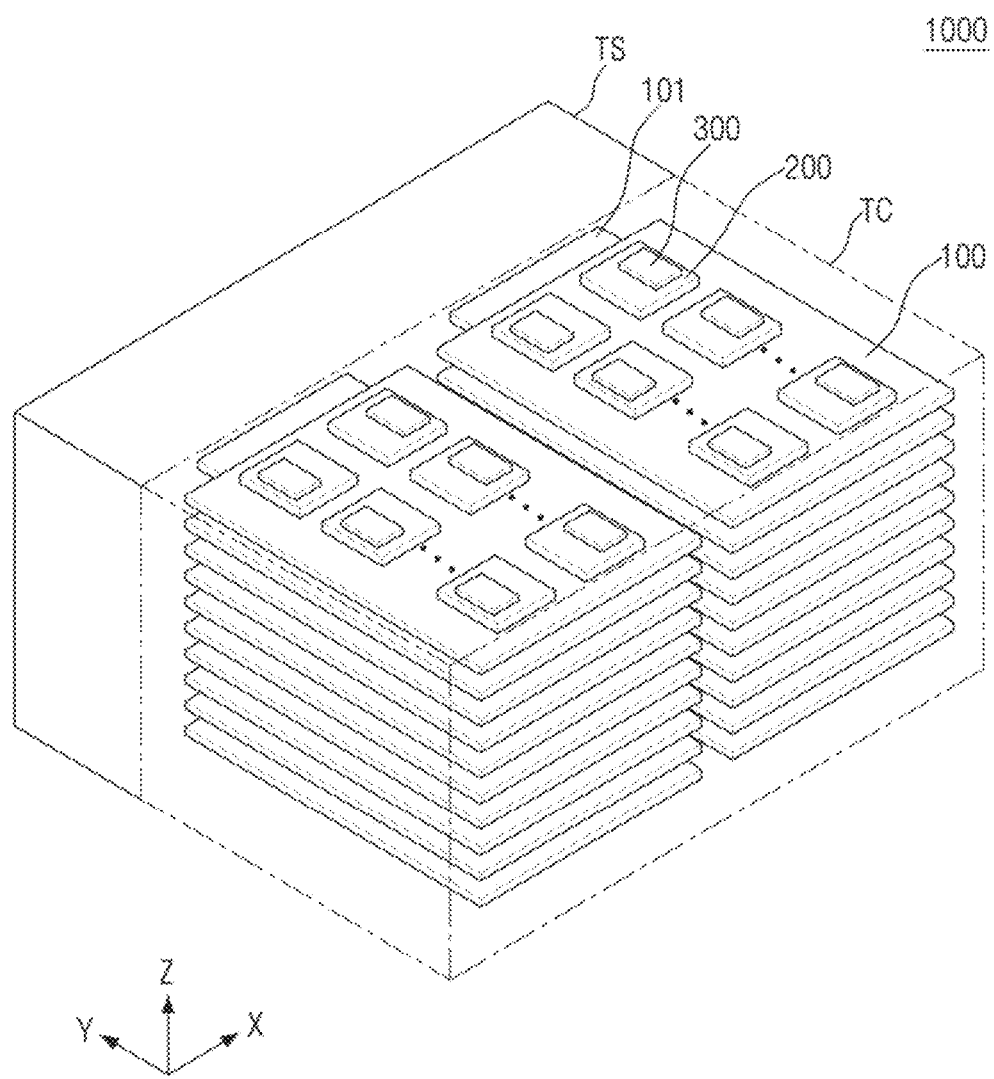
FIG. 6 illustrates a test system according to an embodiment of the present disclosure.

In an embodiment, the connection unit 101 may be disposed on a side of the main board 100 and may include at least a port 103 and a concave portion 105. In an embodiment, the connection unit 101 may be a medium for physically connecting the test device 10 to a test system 1000 (FIG. 6).

In an embodiment, the port 103 may include a plurality of pins. The number, size, and arrangement of pins may be determined based on an interface connected to the test system 1000 (FIG. 6). The pins may be electrically connected to sockets included in the test system 1000 (FIG. 6). At least one concave portion 105 may be included in the connection unit 101 to stably mount and fix the test device 10 to the test system 1000 (FIG. 6).

Test logic may be disposed in the test host area 110. In an embodiment, the test logic may be implemented as a semiconductor chip such as a field programmable gate array (FPGA), an application specific integrated circuit (ASIC), or an application processor (AP). The test logic may transmit and receive various information to and from the semiconductor devices 300, which are DUTs, according to a parallel (e.g., a serial) communication method. For example, in an embodiment the test logic may be configured using an FPGA such as Xilinx, Altera, Lattice Semiconductor, Microsemi, Achronix, QuickLogic, e2v, or Atmel. However, embodiments of the present disclosure are not necessarily limited thereto.

In addition, the test logic may be disposed on the main board 100 or may be disposed outside the main board 100.

In some embodiments, a test input signal and/or test power (hereinafter, collectively referred to as a test input) may be provided from the test host area 110 to the DUT board mounting area 140 through a transmission line 150. The DUT boards 200 in the DUT board mounting area 140 may receive the test input signal from the test host area 110.

The test logic may process data or may be executed by interpreting commands. For example, in an embodiment a test program executed in the test logic may perform testing by inputting a signal generated by an algorithm pattern generator to a semiconductor device 300 to be tested, reading a signal transmitted from the semiconductor device 300, and comparing the read output signal with an expected pattern.

In an instance in which the output signal does not match the expected pattern, the test logic may identify the semiconductor device 300 being tested as defective. For example, in an embodiment in which the semiconductor device 300 is a memory device, the test program may record data generated by the algorithm pattern generator into the semiconductor device 300, read the recorded data from the semiconductor device 300, and compare the read pattern with the expected pattern.

In an embodiment, the test memory 120 may store various data, such as commands of test patterns, data read from the semiconductor devices 300, and test results of the test logic. The test memory 120 may be composed of a buffer and a storage device. For example, in an embodiment the buffer may be a volatile memory, and the storage device may be a non-volatile memory. In some embodiments, the buffer may be a dynamic random access memory (DRAM), and the storage device may be a flash memory, a solid state drive (SSD), or a hard disk drive (HDD). In some embodiments, the buffer may temporarily store signals or store data read from the semiconductor devices 300 and test results to be transmitted. The storage device may store commands of test patterns or test results.

In an embodiment, the test controller 130 may provide a bit stream having one or more pieces of bit information and test power to the DUT boards 200 in the DUT board mounting area 140 using the transmission line 150. In addition, the test controller 130 may control the timing at which power is provided to the DUT boards 200. For example, in an embodiment the test controller 130 may control a signal transmitted to the semiconductor devices 300 to have a frequency within about 400 MHz.

The transmission line 150 may provide a test input from the test host area 110 to the DUT board mounting area 140. For example, the transmission line 150 may provide the test input from the test host area 110 to the semiconductor devices 300 in the DUT boards 200.

In an embodiment, each of the DUT boards 200 may include a substrate base and a DUT socket. Depending on the shape and type of a DUT to be tested, such as a semiconductor device 300, each of the DUT boards 200 may have various shapes and types of DUT sockets for accommodating the DUT. For example, in an embodiment each of the DUT boards 200 may include a DUT socket having a shape corresponding to ball grid array (BGA), plastic leaded chip carrier (PLCC), plastic dual in-line package (PDIP), ceramic dual in-line package (CERDIP), plastic metric quad flatpack (MQFP), thin quad flatpack (TQFP), small outline (SOIC), shrink small outline package (SSOP), thin small outline (TSOP) or thin quad flatpack (TQFP) or may include a universal DUT socket that can correspond to various shapes. However, embodiments of the present disclosure are not necessarily limited thereto and the DUT socket included in each of the DUT boards 200 may further vary.

The connectors 250 may be connected to the DUT boards 200, respectively. A plurality of connectors 250_1 through 250_N may be disposed at ends of a plurality of DUT boards 200_1 through 200_N to transmit input/output signals to the DUT boards 200_1 through 200_N, respectively. In an embodiment, N may be an integer greater than or equal to 3.

A test process for determining whether the semiconductor devices 300 are defective may be performed at various stages of a semiconductor manufacturing process and may include, for example, a wafer-stage test and a post-wafer stage test. The wafer-stage test may correspond to a test performed on an individual semiconductor die at the wafer stage. In addition, the post-wafer stage test may be a test on a semiconductor die before packaging is performed or a test on a semiconductor package after packaging of the semiconductor die is performed.

In particular, a burn-in test may refer to a test process for checking how much the semiconductor devices 300 can withstand thermal stress when the semiconductor devices 300 are operated by transmitting an electrical signal to the semiconductor devices 300.

Each of the semiconductor devices 300 may be a device that performs various functions. In some embodiments, each of a plurality of semiconductor devices 300_1 through 300_N may be a memory device including a memory cell array. For example, in an embodiment the memory device may be a double data rate synchronous dynamic random access memory (DDR SDRAM), a low power double data rate (LPDDR) SDRAM, a graphics double data rate (GDDR) SDRAM, or a Rambus dynamic random access memory (RDRAM). Alternatively, the memory device may be a non-volatile memory such as a flash memory, a magnetic RAM (MRAM), a ferroelectric RAM (FRAM), a phase change RAM (PRAM), or a resistive RAM (RRAM). However, embodiments of the present disclosure are not necessarily limited thereto.

Figure 2:
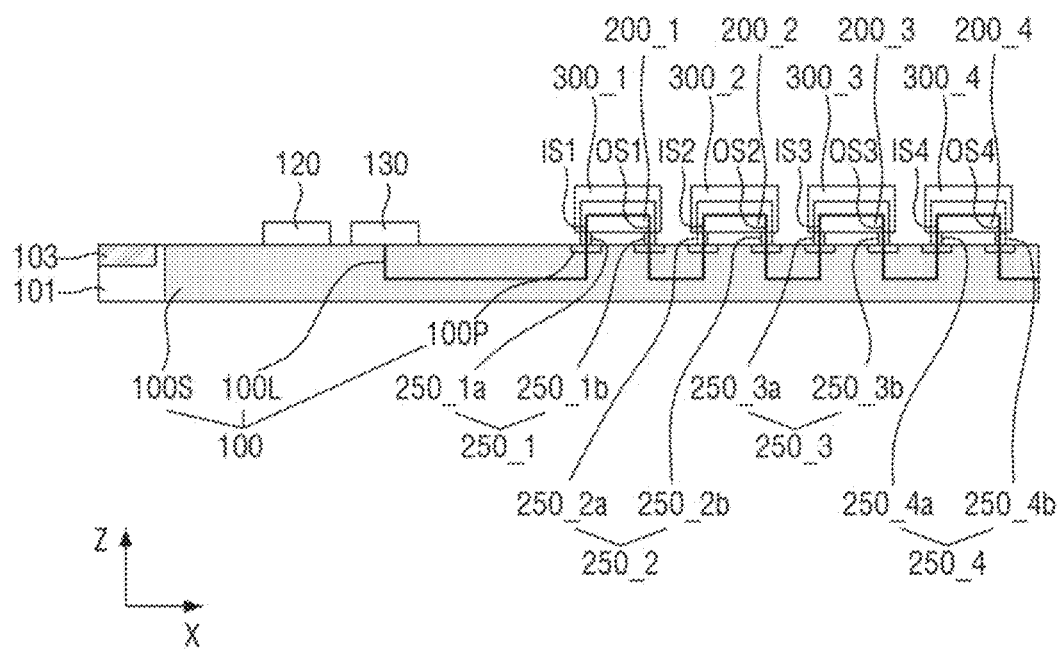
FIGS. 2 and 3 illustrate a test device according to embodiments of the present disclosure.
Figure 3:
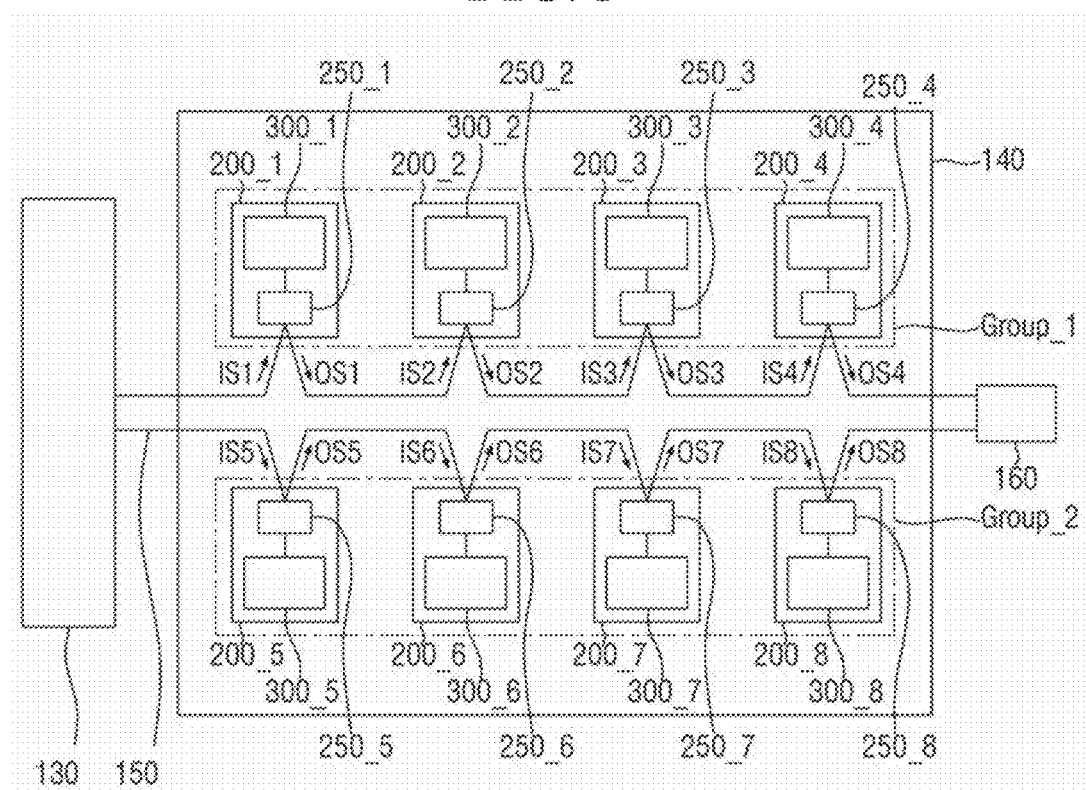

FIGS. 2 and 3 illustrate a test device 10 according to embodiments of the present disclosure.

Referring to FIGS. 2 and 3, the test device 10 may include a main board 100, DUT boards 200, and connectors 250.

In an embodiment, each of the main board 100 and the DUT boards 200 may be a printed circuit board (PCB).

The main board 100 may include a substrate base 100S, an internal wiring 100L included inside the substrate base 100S, and electrode pads 100P formed on an upper surface of the substrate base 100S. The test memory 120, the test controller 130, and the DUT boards 200 described above may be electrically connected to the internal wiring 100L through the electrode pads 100P.

In an embodiment, the substrate base 100S may be made of at least one material selected from phenolic resin, epoxy resin, and polyimide. However, embodiments of the present disclosure are not necessarily limited thereto. For example, the substrate base 100S may include at least one material selected from FR-4, tetrafunctional epoxy, polyphenylene ether, epoxy/polyphenylene oxide, bismaleimide triazine (BT), thermount, cyanate ester, polyimide, and liquid crystal polymer.

In an embodiment, the electrode pads 100P may be made of copper, nickel, stainless steel, or beryllium copper. However, embodiments of the present disclosure are not necessarily limited thereto. The internal wiring 100L may be formed on only one side or both sides of the substrate base 100S. The internal wiring 100L may serve as the transmission line 150 (FIG. 1) in the main board 100.

In an embodiment, three or more layers of copper foil may be formed using a prepreg, and three or more layers of the internal wiring 100L may be formed according to the number of layers of copper foil formed. Accordingly, a PCB having a multilayer structure may be implemented.

The test memory 120 and the test controller 130 may be attached to the same surface of the main board 100. For example, in an embodiment, the test memory 120 and the test controller 130 may be attached to an upper surface of the main board 100. However, embodiments of the present disclosure are not necessarily limited thereto. Alternatively, the test memory 120 and the test controller 130 may be attached to different surfaces of the main board 100 from each other.

The DUT boards 200 may be disposed on the main board 100 in a vertical direction Z. Semiconductor devices 300 may be mounted on the DUT boards 200 as DUTs, respectively.

In an embodiment, the DUT boards 200 may include a first DUT board 200_1 on which a first semiconductor device 300_1 is mounted as a DUT, a second DUT board 200_2 on which a second semiconductor device 300_2 is mounted as a DUT, a third DUT board 200_3 on which a third semiconductor device 300_3 is mounted as a DUT, and a fourth DUT board 200_4 on which a fourth semiconductor device 300_4 is mounted as a DUT. However, embodiments of the present disclosure are not necessarily limited thereto and the numbers of the DUT boards and the semiconductor devices 300 may vary.

The DUT boards 200 may be arranged parallel to an upper surface of the main board 100 and may be spaced apart from each other in first and second directions X and Y intersecting each other. Referring to an embodiment shown in FIG. 2, the first through fourth DUT boards 200_1 through 200_4 may be spaced apart from each other in the first direction X. Referring to FIG. 1, some of first through $N^{th}$ DUT boards 200_1 through 200N may be spaced apart from each other in the second direction Y.

Although the number of semiconductor devices and the number of DUT boards are each four in an embodiment shown in FIG. 2, embodiments of the present disclosure are not necessarily limited thereto. The number of semiconductor devices and the number of DUT boards may be a number other than four.

The connectors 250 may be connected to input/output terminals of the DUT boards 200 and may transmit signals input to and output from the DUT boards 200, respectively.

For example, in an embodiment the connectors 250 may include a first connector 250_1 connected to the first semiconductor device 300_1, a second connector 250_2 connected to the second semiconductor device 300_2, a third connector 250_3 connected to the third semiconductor device 300_3, and a fourth connector 250_4 connected to the fourth semiconductor device 300_4.

In some embodiments, a first end of each DUT board 200 may refer to an area in which the input terminal of the DUT board 200 is disposed, and a second end of each DUT board 200 may refer to an area in which the output terminal of the DUT board 200 is disposed.

The connectors 250 may include a conductive material. For example, in an embodiment a material with low resistance may be used for the connectors 250.

In an embodiment as shown in FIG. 2, the first connector 250_1 may include a $(1a)^{th}$ connector 250_1a and a $(1b)^{th}$ connector 250_1b respectively disposed at a first end and a second end of the first DUT board 200_1 and spaced apart from each other (e.g., in the X direction).

The $(1a)^{th}$ connector 250_1a may be disposed between the main board 100 and the first DUT board 200_1 (e.g., in the Z direction). The $(1b)^{th}$ connector 250_1b may be disposed between the main board 100 and the first DUT board 200_1 (e.g., in the Z direction). The $(1b)^{th}$ connector 250_1b may be disposed between the second end of the first DUT board 200_1 and the first end of the second DUT board 200_2.

In an embodiment, the $(1a)^{th}$ connector 250_1a may transmit a first input signal IS1 input to the first DUT board 200_1, and the $(1b)^{th}$ connector 250_1b may transmit a first output signal output from the first DUT board 200_1.

The first input signal IS1 may form a first electrical path along which the first input signal IS1 is input to the first DUT board 200_1 via the $(1a)^{th}$ connector 250_1a. The first input signal IS1 may be transmitted from the main board 100 to the first DUT board 200_1 via the $(1a)^{th}$ connector 250_1a.

The first output signal OS1 may form a second electrical path along which the first output signal OS1 is output from the first DUT board 200_1 and input to the second DUT board 200_2 via the $(1b)^{th}$ connector 250_1b. The first output signal OS1 may be transmitted from the first DUT board 200_1 to the main board 100 via the $(1b)^{th}$ connector 250_1b. The first output signal OS1 may be transmitted from the main board 100 to the second DUT board 200_2 via a $(2a)^{th}$ connector 250_2a to be described later.

In an embodiment, transmission lines through which the first input signal IS1 and the first output signal OS1 are transmitted may be independently implemented. For example, the first input signal IS1 and the first output signal OS1 may be respectively transmitted by the $(1a)^{th}$ connector 250_1a and the $(1b)^{th}$ connector 250_1b which are not shared with each other and may be transmitted via independent electrical paths.

Accordingly, in the main board 100, a transmission line to which the first input signal IS1 and the first output signal OS1 are directly connected may not be formed between the first input signal IS1 and the first output signal OS1. The first output signal OS1 may be connected back to the main board 100 through the first DUT board 200_1 and the $(1b)^{th}$ connector 250_1b.

The second connector 250_2 may be spaced apart from the first connector 250_1 (e.g., in the X direction). The second connector 2502 may include the $(2a)^{th}$ connector 250_2a and a $(2b)^{th}$ connector 250_2b respectively disposed at a first end and a second end of the second DUT board 200_2 and spaced apart from each other (e.g., in the X direction).

The $(2a)^{th}$ connector 250_2a may be disposed between the main board 100 and the second DUT board 200_2 (e.g., in the Z direction). The $(2b)^{th}$ connector 250_2b may be disposed between the main board 100 and the second DUT board 200_2 (e.g., in the Z direction).

The $(2a)^{th}$ connector 250_2a may transmit a second input signal IS2 input to the second DUT board 200_2, and the $(2b)^{th}$ connector 250_2b may transmit a second output signal OS2 output from the second DUT board 200_2.

The second input signal IS2 may form a third electrical path along which the second input signal IS2 is input to the second DUT board 200_2 via the $(2a)^{th}$ connector 250_2a. The second input signal IS2 may be transmitted from the main board 100 to the second DUT board 200_2 via the $(2a)^{th}$ connector 250_2a.

The second output signal OS2 may form a fourth electrical path along which the second output signal OS2 is output from the second DUT board 200_2 and input to the third DUT board 200_3 via the $(2b)^{th}$ connector 250_2b. The second output signal OS2 may be transmitted from the second DUT board 200_2 to the main board 100 via the $(2b)^{th}$ connector 250_2b. The second output signal OS2 may be transmitted from the main board 100 to the third DUT board 2003 via a $(3a)^{th}$ connector 250_3a to be described later.

Transmission lines through which the second input signal IS2 and the second output signal OS2 are transmitted may be independently implemented. For example, the second input signal IS2 and the second output signal OS2 may be respectively transmitted by the $(2a)^{th}$ connector 250_2a and the $(2b)^{th}$ connector 250_2b which are not shared with each other and may be transmitted via independent electrical paths.

Accordingly, in the main board 100, a transmission line to which the second input signal IS2 and the second output signal OS2 are directly connected may not be formed between the second input signal IS2 and the second output signal OS2. The second output signal OS2 may be connected back to the main board 100 through the second DUT board 200_2 and the $(2b)^{th}$ connector 250_2b.

The third connector 250_3 may be spaced apart from the second connector 250_2 (e.g., in the X direction). The third connector 2503 may include the $(3a)^{th}$ connector 250_3a and a $(3b)^{th}$ connector 250_3b respectively disposed at a first end and a second end of the third DUT board 200_3 and spaced apart from each other (e.g., in the X direction).

The $(3a)^{th}$ connector 250_3a may transmit a third input signal IS3 input to the third DUT board 200_3, and the $(3b)^{th}$ connector 250_3b may transmit a third output signal OS3 output from the third DUT board 200_3.

The third input signal IS3 may form a fifth electrical path along which the third input signal IS3 is input to the third DUT board 200_3 via the $(3a)^{th}$ connector 250_3a. The third input signal IS3 may be transmitted from the main board 100 to the third DUT board 200_3 via the $(3a)^{th}$ connector 250_3a.

The third output signal OS3 may form a sixth electrical path along which the third output signal OS3 is output from the third DUT board 200_3 and input to the fourth DUT board 200_4 via the $(3b)^{th}$ connector 250_3b. The third output signal OS3 may be transmitted from the third DUT board 200_3 to the main board 100 via the $(3b)^{th}$ connector 250_3b. The third output signal OS3 may be transmitted from the main board 100 to the fourth DUT board 200_4 via a $(4a)^{th}$ connector 250_4a to be described later.

Transmission lines through which the third input signal IS3 and the third output signal OS3 are transmitted may be independently implemented. For example, the third input signal IS3 and the third output signal OS3 may be respectively transmitted by the $(3a)^{th}$ connector 250_3a and the $(3b)^{th}$ connector 250_3b which are not shared with each other and may be transmitted via independent electrical paths.

Accordingly, in the main board 100, a transmission line to which the third input signal IS3 and the third output signal OS3 are directly connected may not be formed between the third input signal IS3 and the third output signal OS3. The third output signal OS3 may be connected back to the main board 100 through the third DUT board 200_3 and the $(3b)^{th}$ connector 250_3b.

The fourth connector 250_4 may be spaced apart from the third connector 250_3 (e.g., in the X direction). The fourth connector 250_4 may include the $(4a)^{th}$ connector 250_4a and a $(4b)^{th}$ connector 250_4b respectively disposed at a first end and a second end of the fourth DUT board 200_4 and spaced apart from each other (e.g., in the X direction).

The $(4a)^{th}$ connector 250_4a may transmit a fourth input signal IS4 input to the fourth DUT board 200_4, and the $(4b)^{th}$ connector 250_4b may transmit a fourth output signal OS4 output from the fourth DUT board 200_4.

The fourth input signal IS4 may form a seventh electrical path along which the fourth input signal IS4 is input to the fourth DUT board 200_4 via the $(4a)^{th}$ connector 250_4a. The fourth input signal IS4 may be transmitted from the main board 100 to the fourth DUT board 200_4 via the $(4a)^{th}$ connector 250_4a.

The fourth output signal OS4 may form an eighth electrical path along which the fourth output signal OS4 is output from the fourth DUT board 200_4 via the $(4b)^{th}$ connector 250_4b. The fourth output signal OS4 may be transmitted from the fourth DUT board 200_4 to the main board 100 via the $(4b)^{th}$ connector 250_4b. In an embodiment, the fourth output signal OS4 may be transmitted from the fourth DUT board 200_4 to a termination point 160 through a transmission line 150.

Transmission lines through which the fourth input signal IS4 and the fourth output signal OS4 are transmitted may be independently implemented. For example, the fourth input signal IS4 and the fourth output signal OS4 may be respectively transmitted by the $(4a)^{th}$ connector 250_4a and the $(4b)^{th}$ connector 250_4b which are not shared with each other and may be transmitted via independent electrical paths.

Accordingly, in the main board 100, a transmission line to which the fourth input signal IS4 and the fourth output signal OS4 are directly connected may not be formed between the fourth input signal IS4 and the fourth output signal OS4. The fourth output signal OS4 may be connected back to the main board 100 through the fourth DUT board 200_4 and the $(4b)^{1\imath}$ connector 250_4b.

Referring to FIG. 3, the DUT boards 200 on which semiconductor devices 300 are respectively disposed may be mounted in the test device 10 and may be divided into first and second groups Group_1 and Group_2.

Although only the first and second groups Group_1 and Group_2 are illustrated in an embodiment shown in FIG. 3, the number of groups are not necessarily limited thereto. In addition, although the first and second groups Group_1 and Group_2 include the same number of DUT boards 200 in the drawing, embodiments of the present disclosure are not necessarily limited thereto. For example, the first and second groups Group_1 and Group_2 may also include different numbers of DUT boards 200 from each other. In addition, in an embodiment the semiconductor devices 300 to be tested may be semiconductor dies or semiconductor packages.

The above description of the first through fourth DUT boards 200_1 through 200_4, the first through fourth semiconductor devices 300_1 through 300_4, and the first through fourth connectors 2501 through 250_4 may also be applied to fifth through eighth DUT boards 200_5 through 200_8, fifth through eighth semiconductor devices 3005 through 300_8, and fifth through eighth connectors 250_5 through 250_8. Therefore, a repeated description is omitted for economy of description.

In addition, the above description of the first through fourth input signals IS1 through IS4 and the first through fourth output signals OS1 through OS4 may also be applied to fifth through eighth input signals IS5 through IS8 and fifth through eighth output signals OS5 through OS8. Therefore, a repeated description is omitted for economy of description.

According to an embodiment, in one semiconductor device, an input test signal and an output test signal may implement independent electrical paths. For example, the input test signal and the output test signal may not be separated in a main board after passing through one electrical path, but may pass through different electrical paths. Accordingly, test signal stubs may be reduced, and thus signal characteristics may be further increased.

Figure 4:
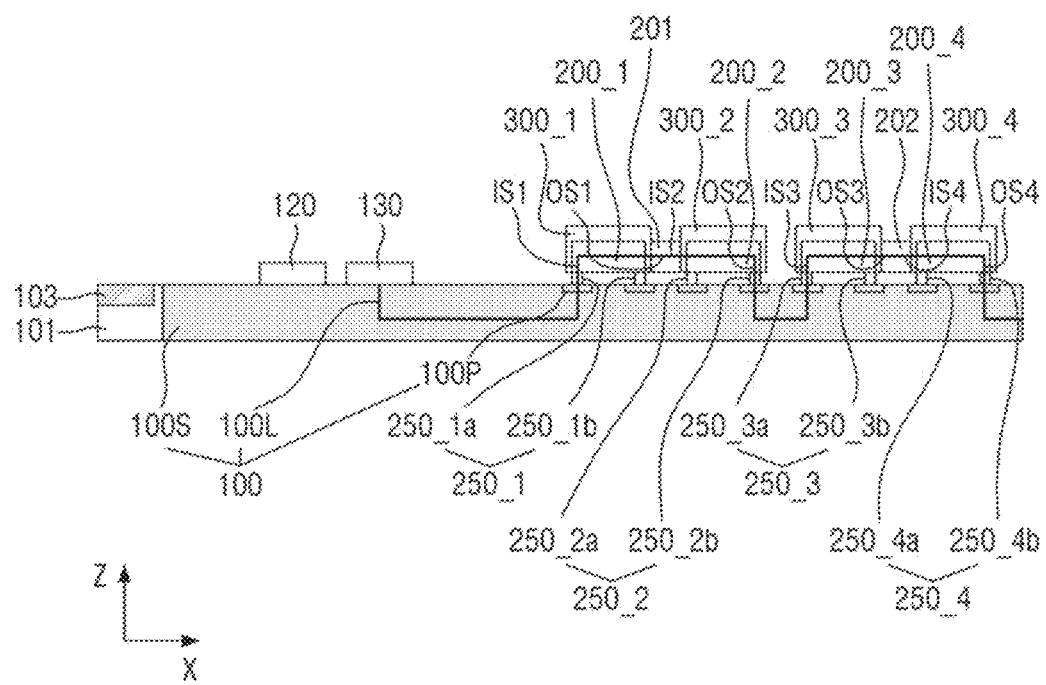
FIGS. 4 and 5 illustrate a test device according to embodiments of the present disclosure.
Figure 5:
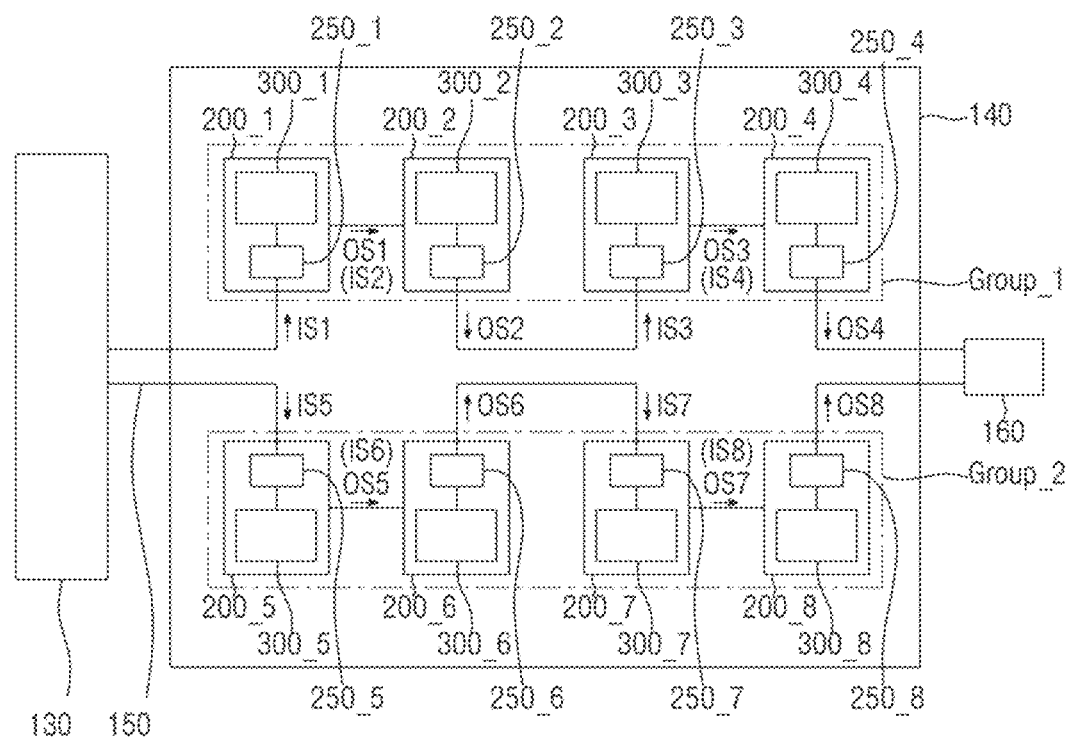

FIGS. 4 and 5 illustrate a test device 10 according to embodiments of the present disclosure. For ease of description, the same elements and features as those described above with reference to FIGS. 1 through 3 may not be described for economy of description.

Referring to FIGS. 4 and 5, the test device 10 may further include connection boards, such as first and second connection boards 201 and 202, that connect DUT boards 200 to each other. For example, in an embodiment the connection boards, such as the first and second connection boards 201 and 202, may be formed as a part of the DUT boards 200. However, embodiments of the present disclosure are not necessarily limited thereto.

In an embodiment, a first connection board 201 may be disposed between a second end of a first DUT board 200_1 and a first end of a second DUT board 200_2 that is disposed adjacent to the first DUT board 200_1 (e.g., in the X direction). For example, the first connection board 201 may be disposed between an output terminal of the first DUT board 200_1 and an input terminal of the second DUT board 200_2. The first connection board 201 may be spaced apart from a main board 100 in the vertical direction Z.

A first output signal OS1 and a second input signal IS2 may be transmitted from the first DUT board 200_1 to the second DUT board 200_2 via the first connection board 201. A second output signal OS2 may be transmitted from the second DUT board 200_2 to the main board 100 via a $(2b)^{th}$ connector 250_2b.

A second connection board 202 may be disposed between a second end of a third DUT board 200_3 and a first end of a fourth DUT board 200_4 that is adjacent to the third DUT board 2003 (e.g., in the X direction). For example, the second connection board 202 may be disposed between an output terminal of the third DUT board 200_3 and an input terminal of the fourth DUT board 200_4. The second connection board 202 may be spaced apart from the main board 100 in the vertical direction Z.

A third output signal OS3 and a fourth input signal IS4 may be transmitted from the third DUT board 200_3 to the fourth DUT board 200_4 via the second connection board 202. The fourth output signal OS4 may be transmitted from the fourth DUT board 200_4 to the main board 100 via a $(4b)^{th}$ connector 250_4b.

FIG. 6 illustrates a test system 1000 according to an embodiment of the present disclosure.

Referring to FIG. 6, the test system 1000 may be configured as a test facility including a test server TS and a test chamber TC.

In an embodiment, the test server TS may collectively refer to a main part of a test facility that can store test programs of the test system 1000, execute test commands, and determine test results.

Test devices 10 may be mounted in the test chamber TC. In some embodiments, each of the test devices 10 mounted in the test chamber TC may receive test power from a power supply unit of the test server TS through a connection unit 101.

DUT boards 200 on which semiconductor devices 300 are disposed may be connected to each of the test devices 10. In an embodiment, the semiconductor devices 300 which are DUTs may be electrically connected to each of the test devices 10 through the DUT boards 200. For example, the semiconductor devices 300 may be accommodated in DUT sockets and connected to the DUT boards 200. The DUT boards 200 may be placed first in each of the test devices 10 before accommodating the semiconductor devices 300 in the DUT sockets.

In the test system 1000, the test devices 10 to which the semiconductor devices 300 are connected may be placed in the test chamber TC and may test the semiconductor devices 300 by exchanging signals with the test server TS through communication therewith.

In an embodiment, tests on the semiconductor devices 300 may include, for example, a burn-in test, a DC test, an AC test, and a function test. However, embodiments of the present disclosure are not necessarily limited thereto. For example, the burn-in test may refer to a test for checking how much a semiconductor device 300 can withstand thermal stress when the semiconductor device 300 is operated by transmitting an electrical signal to the semiconductor device 300. In the DC test, a voltage or current may be applied as an invariable analog signal, and then a current in response to voltage application or a voltage in response to current application may be measured. In the AC test, a voltage may be mainly input as a variable analog signal, and then a time at which a measurement signal changes with respect to a reference signal may be measured. The function test may determine whether there is a logic error after inputting a variable digital signal.

In an embodiment, the tests on the semiconductor devices 300 may be performed under a room temperature condition, a low temperature condition, a high temperature condition, or the like according to the temperature set in the test chamber TC. In addition, the tests on the semiconductor devices 300 may be performed under a dry condition, a high humidity condition, or the like according to the humidity set in the test chamber TC. For example, the test chamber TC may provide various temperature and/or humidity environments according to a command of the test server TS.

After the tests are completed, the semiconductor devices 300 connected to the DUT boards 200 may be separated from the DUT boards 200. In some embodiments, the test server TS may separate the semiconductor devices 300 from the DUT boards 200 while distinguishing semiconductor devices 300 that have passed the tests from semiconductor devices 300 that have not passed the tests (e.g., a failure of the tests which indicates a defect in the semiconductor device 300). In some embodiments, the test server TS may separate the semiconductor devices 300 from the DUT boards 200 while distinguishing repairable semiconductor devices 300, semiconductor devices 300 to be retested, and semiconductor devices 300 to be discarded among the semiconductor devices 300 that have failed the tests. In other embodiments, the semiconductor devices 300 to be retested may be retested without being separated from the DUT boards 200. Alternatively, the semiconductor devices 300 to be retested may be separated from the DUT boards 200 on which the tests were performed and then may be connected to other DUT boards 200 and retested.

Figure 7:
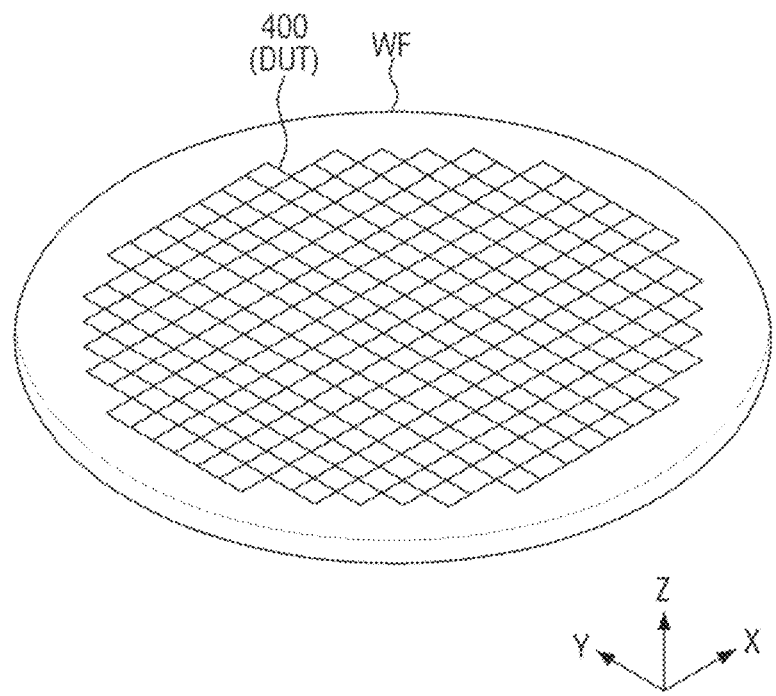
FIG. 7 illustrates a semiconductor wafer on which semiconductor devices under test (DUTs) are disposed.

FIG. 7 illustrates a semiconductor wafer WF on which semiconductor devices such as DUTs are disposed according to an embodiment of the present disclosure.

Referring to FIG. 7, a plurality of semiconductor dies 400 manufactured by a semiconductor manufacturing process may be disposed in an array form on the semiconductor wafer WF, and each of the semiconductor dies 400 may form a DUT in a wafer-stage test.

In an embodiment, the semiconductor wafer WF may be a silicon (Si) wafer. In an embodiment, the semiconductor wafer WF may include a semiconductor element such as germanium (Ge) or a semiconductor compound such as silicon carbide (SiC), gallium arsenide (GaAs), indium arsenide (InAs), or indium phosphide (InP). The semiconductor wafer WF may have a silicon on insulator (SOI) structure. For example, the semiconductor wafer WF may include a buried oxide layer. The semiconductor wafer WF may include a conductive region, for example, a well doped with impurities and/or a structure doped with impurities. In addition, the semiconductor wafer WF may have various device isolation structures such as a shallow trench isolation (STI) structure, etc.

Semiconductor devices 300 (see FIG. 1) to be tested may be the semiconductor dies 400. Each of the semiconductor dies 400 may be configured as a volatile memory device or a non-volatile memory device. For example, in an embodiment the volatile memory device may be implemented in various forms such as a DRAM, a static random access memory (SRAM), and a double data rate DRAM (DDR DRAM). In addition, the non-volatile memory device may be implemented in various forms such as a flash memory, a PRAM, an RRAM, an FRAM, or an MRAM. A contact pad that can electrically connect an internal circuit and an external device may be formed in each of the semiconductor dies 400.

Figure 8:
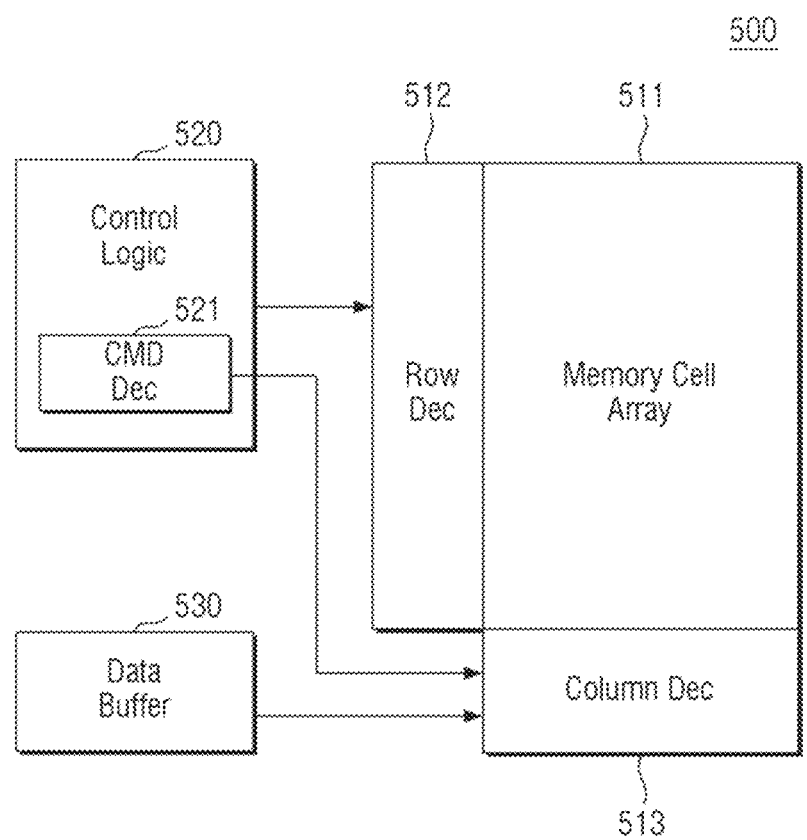
FIG. 8 is a block diagram of a semiconductor device, such as a semiconductor device under test (DUT) implemented as a memory device.

FIG. 8 is a block diagram of a semiconductor device, such as a DUT, implemented as a memory device 500. For ease of description, the same elements and features as those described above with reference to FIGS. 1 through 5 may not be described.

Referring to FIG. 8, in an embodiment the memory device 500 may include a memory cell array 511, a row decoder 512 (Row Dec) and a column decoder 513 (Column Dec) for a memory operation of storing and reading data. The memory device 500 may further include a control logic 520 for controlling the overall internal operation of the memory device 500 and a data buffer 530 for temporarily storing input/output data.

The control logic 520 may control memory operations according to various signals from a memory controller. For example, in an embodiment the control logic 520 may receive addresses from the memory controller, provide row addresses for selecting word lines of the memory cell array 511 to the row decoder 512, and provide column addresses for selecting bit lines of the memory cell array 511 to the column decoder 513. In addition, the control logic 520 may include a command decoder 521 (CMD Dec) that decodes a command from the memory controller to control the internal operation of the memory device 500.

In an embodiment, a semiconductor device 300 (FIG. 1) to be tested (e.g., DUT) may be the memory device 500. In some embodiments, in a test environment of the memory device 500, information corresponding to a command/address from test logic may be provided to the memory device 500 as a test input, and information corresponding to data may be provided to the memory device 500 as a test input. In addition, in an embodiment in the test environment of the memory device 500, the memory device 500 may perform signal processing using a test input, generate a test output as a result, and provide the test output to the external test logic.

Figure 9:
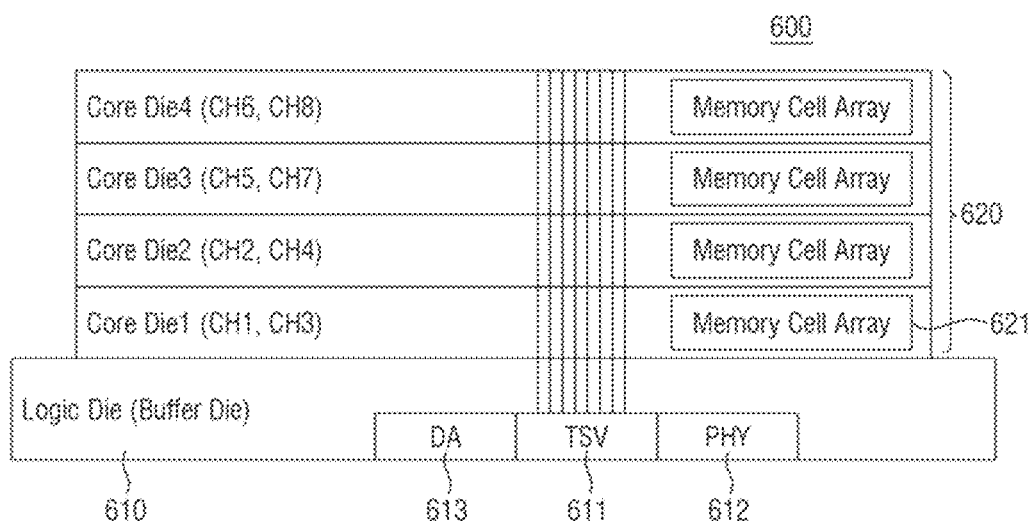
FIG. 9 illustrates a semiconductor device under test (DUTs) implemented as a semiconductor package.

FIG. 9 illustrates a semiconductor device (e.g., a DUT) implemented as a semiconductor package 600. For ease of description, the same elements and features as those described above with reference to FIGS. 1 through 5 may not be described.

Referring to FIG. 9, the semiconductor package 600 may include a plurality of semiconductor dies and may include a logic die 610 and one or more core dies 620. Each of the core dies 620 may include a memory cell array 621.

The semiconductor package 600 may have an increased bandwidth by including a plurality of channels, such as first to eight channels CH1 through CH8, having independent interfaces. However, embodiments of the present disclosure are not necessarily limited thereto and the number of core dies 620 and the number of channels included in the semiconductor package 600 may be variously changed.

In an embodiment, the logic die 610 may include a through silicon via (TSV) area 611, a physical area 612 (PHY), and a direct access area 613 (DA). In addition, the logic die 610 may further include control logic for controlling the overall internal operation of the semiconductor package 600. In an embodiment, the logic die 610 may perform an internal control operation in response to a command from an external controller.

The TSV area 611 corresponds to an area where TSVs for communication with the core dies 620 are formed. In addition, the physical area 612 (PHY) may include a plurality of input/output circuits for communication with the external controller. In an embodiment, the direct access area 613 (DA) may communicate with a test server TS (FIG. 6) through a conductive medium, which is disposed on an outer surface of the semiconductor package 600, in a test performed on the semiconductor package 600. Various signals from the test server TS (see FIG. 6) may be provided to the core dies 620 through the direct access area 613 (DA) and the TSV area 611.

While the present disclosure has been particularly illustrated and described with reference to non-limiting embodiments thereof, it will be understood by those of ordinary skill in the art that various changes in form and detail may be made therein without departing from the spirit and scope of the present disclosure. Therefore, the described embodiments should be considered in a descriptive sense only and not for purposes of limitation.

What is claimed is:

1. A test device comprising:
a main board;
first and second device under test (DUT) boards disposed on the main board, wherein first and second semiconductor devices are mounted on the first and second DUT boards, respectively, the first and second semiconductor devices are DUTs; and
first and second connectors respectively disposed at a first end and a second end of the first DUT board, the first and second connectors are spaced apart from each other and respectively transmit first and second signals,
wherein the first signal forms a first electrical path along which the first signal is input to the first DUT board via the first connector, and the second signal forms a second electrical path along which the second signal is output from the first DUT board and input to the second DUT board via the second connector,
wherein a connection board including the second connector is disposed between the second end of the first DUT board and a first end of the second DUT board, and
wherein the connection board is spaced apart from the main board.

2. The test device of claim 1, wherein the first and second electrical paths are independent electrical paths that are not shared with each other.

3. The test device of claim 1, wherein the first connector is disposed between the main board and the first DUT board.

4. The test device of claim 3, wherein the first signal is transmitted from the main board to the first DUT board via the first connector.

5. The test device of claim 1, wherein the second connector is disposed between the second end of the first DUT board and the first end of the second DUT board and spaced apart from the main board.

6. The test device of claim 5, further comprising a third connector disposed at a second end of the second DUT board and spaced apart from the second connector, wherein the second signal is transmitted from the first DUT board to the second DUT board via the second connector, and a third signal is transmitted from the second DUT board to the main board via the third connector.

7. The test device of claim 1, further comprising third and fourth DUT boards spaced apart from the first and second DUT boards, wherein third and fourth semiconductor devices are mounted on the third and fourth DUT boards, respectively, the third and fourth semiconductor devices are DUTs.

8. A test device comprising:
a main board;
first and second DUT boards disposed on the main board, wherein first and second semiconductor devices are mounted on the first and second DUT boards, respectively, the first and second semiconductor devices are DUTs;
a first transmission line connected to an input terminal of the first DUT board, wherein a first signal input to the first DUT board is transmitted through the first transmission line; and
a second transmission line connected to an output terminal of the first DUT board, wherein a second signal output from the first DUT board and input to the second DUT board is transmitted through the second transmission line,
wherein the first and second transmission lines are independent electrical lines that are not shared with each other, and
wherein the second transmission line is spaced apart from the main board.

9. The test device of claim 8, wherein the first signal does not pass through the second transmission line, and the second signal does not pass through the first transmission line.

10. The test device of claim 8, wherein:
the first transmission line is disposed between the main board and the input terminal of the first DUT board; and
the first signal is transmitted from the main board to the input terminal of the first DUT board via the first transmission line.

11. The test device of claim 8, wherein the second transmission line is disposed between the output terminal of the first DUT board and an input terminal of the second DUT board.

12. The test device of claim 11, wherein the second signal is transmitted from the output terminal of the first DUT board to the second DUT board via the second transmission line.

13. The test device of claim 11, further comprising a third transmission line connected to an output terminal of the second DUT board and spaced apart from the second transmission line, the third transmission line transmits a third signal, wherein the third signal is transmitted from the second DUT board to the main board via the third transmission line.

14. A test system comprising:
a test facility comprising a test chamber; and
a test board disposed in the test chamber and receiving power from the test facility,
wherein the test board comprises:
a main board;
first and second DUT boards disposed on the main board, wherein first and second semiconductor devices are mounted on the first and second DUT boards, respectively, the first and second semiconductor devices are DUTs;
a first transmission line connected to an input terminal of the first DUT board, wherein a first signal input to the first DUT board is transmitted through the first transmission line; and
a second transmission line connected to an output terminal of the first DUT board, wherein a second signal output from the first DUT board and input to the second DUT board is transmitted through the second transmission line,
wherein a transmission line is not formed between the input terminal and the output terminal in the main board.

15. The test system of claim 14, wherein:
the first transmission line is disposed between the main board and the input terminal of the first DUT board; and
the first signal is transmitted from the main board to the input terminal of the first DUT board via the first transmission line.

16. The test system of claim 14, wherein:
the second transmission line is disposed between the main board and the output terminal of the first DUT board; and
the second signal is transmitted from the output terminal of the first DUT board to the main board via the second transmission line.

17. The test system of claim 14, wherein:
the second transmission line is disposed between the output terminal of the first DUT board and an input terminal of the second DUT board, the second transmission line is spaced apart from the main board; and
the second signal is transmitted from the output terminal of the first DUT board to the second DUT board via the second transmission line.

\* \* \* \* \*